C. V. WALKER.
STEAM BOILER INDICATOR AND RECORDER.
APPLICATION FILED FEB. 15, 1917.
1,279,187.
Patented Sept. 17, 1918.
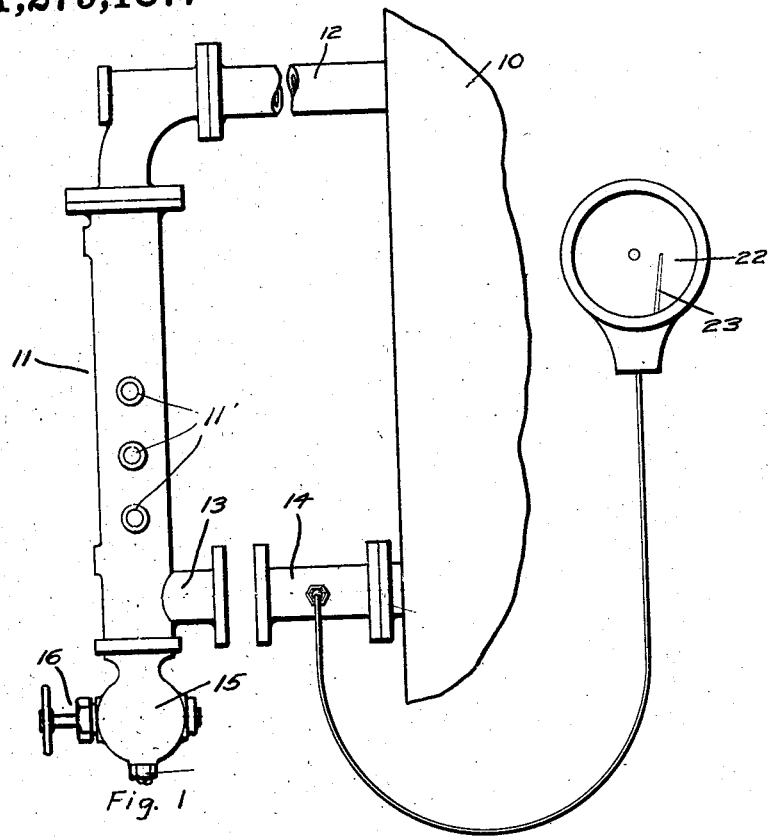
Fig. 1
Fig. 2
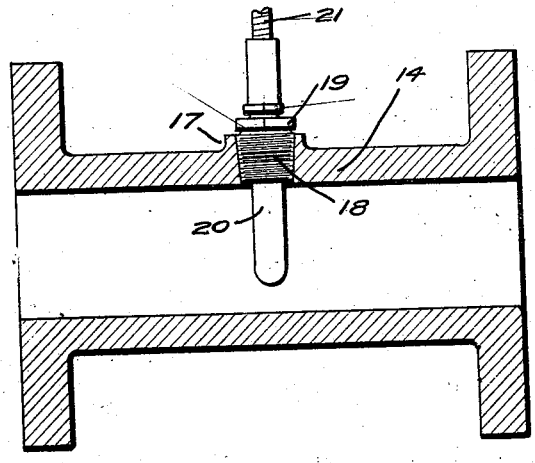
Fig. 3
INVENTOR
CHARLES V. WALKER.
BY Hazard & Miller
ATTORNEYS.

UNITED STATES PATENT OFFICE.

CHARLES V. WALKER, OF LONG BEACH, CALIFORNIA.

STEAM-BOILER INDICATOR AND RECORDER.

1,279,187.   Specification of Letters Patent.   Patented Sept. 17, 1918.

Application filed February 15, 1917.   Serial No. 148,921.

*To all whom it may concern:*

Be it known that I, CHARLES V. WALKER, a citizen of the United States, residing at Long Beach, in the county of Los Angeles and State of California, have invented new and useful Improvements in Steam-Boiler Indicators and Recorders, of which the following is a specification.

My object is to provide means which will indicate and record chronologically the sudden fluctuations caused by opening the test cock in the lower leg of a steam water gage, and my invention consists in the novel features herein shown, described and claimed.

In maintaining steam boilers in continuous operation and safe working condition it has been found that the operation of the boilers cannot be intrusted to unreliable attendants who may not comply with the boiler inspector's rules as to testing the pipes, blowing off the gage valves, and otherwise maintaining the boiler in a properly filled and heated condition. It is the principal object of this invention to provide a recording thermometer which will be so connected with the boiler and gage as to indicate by the sudden fluctuations in the temperature recordings the manner in which the boiler has been cared for during the absence of the superintendent. A series of observation ports 11' are formed along the side of the water gage and are covered with glass, so that the level of the water therein may be seen.

Figures 1 and 2 are views in elevation showing a water gage, the head of a boiler, the upper and lower legs connecting the gage to the head of the boiler, and an indicating thermometer connected to the lower leg.

Fig. 3 is an enlarged sectional detail of the fitting incorporated into the lower leg of the connection, and showing the thermometer inserted into position for use.

Referring more particularly to the drawings, 10 indicates a boiler of any desired construction and which is here shown as provided with a water gage 11. This gage extends vertically and is connected to the boiler by means of an upper connecting pipe or leg 12 and a lower connection or leg 13. In the present case the lower connection is supplemented by an interposed coupling pipe 14 which serves as a mounting for the recording thermometer. The lower end of the water gage is supplied with a blow-off test cock 15 controlled by a hand wheel 16, as is common. These parts are of standard construction and may be arranged as desired.

Reference being had to Fig. 3 it will be seen that the coupling pipe 14 is formed with bolting flanges at its opposite ends by which it is secured in place and that it further has a threaded boss 17 extending through one of its walls. This boss is provided to receive a threaded plug 18 which is screwed in place by its hexagon head 19. Mounted within the plug is a thermometer bulb 20 which extends into the passage through the pipe and is thus in a position to record the temperature therein. The bulb 20 is in communication with an operating tube 21 which extends outwardly through a suitable sleeve upon the plug 18 and is led to a recording device 22. Within this recorder the wire actuates a stylus arm 23 which is adapted to travel over the face of a recording dial and to graphically indicate the sudden changes in the temperatures within the pipe coupling 14.

In operation the apparatus will be used as follows:

When positioned with its bulb extending into the passage-way through the pipe 14 it will record the temperature and the fluctuations in temperature of the water passing along the pipe and standing in the water gage. It will be understood that this temperature will be considerably lower than the temperature within the boiler. However, the recorded indications will properly register the conditions desired to be ascertained. As long as the water stands at a proper height within the water gage, the recorder will indicate a temperature corresponding to this desirable condition. When the water becomes low within the boiler, steam will pass around the thermometer bulb 20 and the recorder will indicate a corresponding rise in temperature. It will be further noted that when the gage valves are blown off the excessively heated boiler water will pass through the pipe 14 and cause a variation in the reading upon the recorder and that these various conditions, as well as the fluctuation of the recorded temperatures will indicate exactly what care the boiler has had during the absence of the inspector.

It will thus be seen that the apparatus here disclosed is simple in its operation and that it acts as an effective and positive check upon the performance of a boiler and the care given it by the workmen in charge of its maintenance.

While I have shown the preferred construction of my indicating and recording apparatus as now known to me, it will be understood that various changes in the construction, combination and arrangement of parts may be made by those skilled in the art without departing from the spirit of my invention.

I claim:

A steam boiler indicator and recorder comprising the combination with a steam boiler and a water gage having upper and lower legs in connection with the boiler and having a test cock extending from the lower leg, of a chronologically recording thermometer connected to the lower leg to record the sudden fluctuations in temperature caused by opening the test cock.

In testimony whereof I have signed my name to this specification.

CHARLES V. WALKER.